United States Patent
Squire et al.

(10) Patent No.: US 9,278,673 B2
(45) Date of Patent: Mar. 8, 2016

(54) VEHICLE BODY ASSEMBLY

(71) Applicant: Nissan North America, Inc., Franklin, TN (US)

(72) Inventors: Timothy Squire, Marshall, MI (US); Michael McDuffie, Warren, MI (US)

(73) Assignee: Nissan North America, Inc., Franklin, TN (US)

( * ) Notice: Subject to any disclaimer, the term of this patent is extended or adjusted under 35 U.S.C. 154(b) by 153 days.

(21) Appl. No.: 14/017,101

(22) Filed: Sep. 3, 2013

(65) Prior Publication Data

US 2015/0066322 A1    Mar. 5, 2015

(51) Int. Cl.
| | |
|---|---|
| *B60T 7/20* | (2006.01) |
| *B60T 7/10* | (2006.01) |
| *B60T 8/17* | (2006.01) |
| *B60T 17/22* | (2006.01) |
| *B60T 17/18* | (2006.01) |

(52) U.S. Cl.
CPC ... *B60T 7/20* (2013.01); *B60T 7/10* (2013.01); *B60T 8/1708* (2013.01); *B60T 17/22* (2013.01); *B60T 17/18* (2013.01); *B60T 2260/04* (2013.01); *B60T 2260/08* (2013.01); *B60T 2260/09* (2013.01)

(58) Field of Classification Search
CPC ......... B60T 7/20; B60T 8/1708; B60T 17/18; B60T 17/22; B60T 2260/04; B60T 2260/08; B60T 2260/09; B60T 7/10
USPC ......................................................... 701/70
See application file for complete search history.

(56) References Cited

U.S. PATENT DOCUMENTS

| | | | | |
|---|---|---|---|---|
| 4,077,487 | A * | 3/1978 | Misinchuk ...................... 180/78 |
| 5,707,262 | A * | 1/1998 | Huntley et al. .................. 440/53 |
| 5,855,144 | A * | 1/1999 | Parada ............................ 74/552 |
| 6,068,352 | A * | 5/2000 | Kulkarni et al. ................ 303/20 |
| 6,371,572 | B1 * | 4/2002 | Frank ............................... 303/20 |
| D468,704 | S | 1/2003 | Reichard |
| 6,532,841 | B2 | 3/2003 | Medico et al. |
| 6,609,768 | B1 * | 8/2003 | Frank .............................. 303/20 |
| 6,837,551 | B2 * | 1/2005 | Robinson et al. ................. 303/7 |
| 7,217,894 | B2 | 5/2007 | Miyako et al. |
| 7,278,510 | B1 | 10/2007 | Richards |
| 7,845,457 | B2 | 12/2010 | Baluch et al. |
| 8,438,943 | B2 * | 5/2013 | Herbert et al. ............. 74/473.31 |
| 2003/0168908 | A1 * | 9/2003 | Robinson et al. .................. 303/7 |
| 2005/0077780 | A1 * | 4/2005 | Robertson .......................... 303/7 |
| 2006/0287798 | A1 * | 12/2006 | Inoue et al. ...................... 701/70 |
| 2009/0218160 | A1 | 9/2009 | Baluch et al. |
| 2014/0288795 | A1 * | 9/2014 | Albright et al. ................. 701/70 |

OTHER PUBLICATIONS

Steering Wheel and Column-Mounted Controls, dated prior to Aug. 2013.

* cited by examiner

*Primary Examiner* — Jason Holloway
(74) *Attorney, Agent, or Firm* — Global IP Counselors, LLP

(57) ABSTRACT

A vehicle body assembly includes a steering column assembly, a steering wheel, an actuator mechanism and a controller. The steering wheel is rotatably supported to the steering column assembly for rotation about a first axis. The actuator mechanism is connected to the steering column assembly and includes a lever movable relative to the steering column assembly between a first position and a second position about a second axis that extends in a direction perpendicular to the first axis. The controller is operably connected to the actuator mechanism and to a trailer connector such that in response to the lever moving from the first position toward the second position, the controller transmits a braking signal to the trailer connector corresponding to activation of a trailer braking system of a trailer.

20 Claims, 11 Drawing Sheets

VEHICLE BODY ASSEMBLY

BACKGROUND

1. Field of the Invention

The present invention generally relates to a vehicle body assembly that includes an actuator mechanism coupled to a steering column within a vehicle. More specifically, the present invention relates to an actuator mechanism supported on a steering column or a steering wheel of the vehicle, the actuator mechanism being configured to actuate trailer brakes.

2. Background Information

Many vehicles are provided with towing capabilities. For example, a rear end of a vehicle can be provided with a trailer hitch such that a trailer can be mechanically attached to the trailer hitch and towed behind the vehicle. An electrical connector is also provided at the rear of the vehicle such that a mating electrical connector on a trailer wiring harness of the trailer can be attached to the electrical connector. The electrical connector provides an operating connection between the brake lights and vehicle brakes of the vehicle, and trailer lights and trailer brakes of the trailer. More specifically, the electrical connector provides an operating connection between the vehicle brakes and the trailer brakes. Consequently, when a vehicle operator engages the vehicle brakes, the trailer brakes are simultaneously engaged.

Some towing vehicles are provided with a separate a trailer brake control mechanism within the passenger compartment of the vehicle. The trailer brake control mechanism provides the driver with a means for engaging the trailer brakes independently from engagement of the vehicle brakes. However, the conventional trailer brake control mechanism is typically mounted below the instrument panel of the vehicle or on the instrument panel of the towing vehicle. Consequently, the driver of the towing vehicle must take one hand off the vehicle steering wheel in order to operate the trailer brake control mechanism.

SUMMARY

One object of the disclosure is to provide a trailer brake actuation mechanism that is located adjacent to a steering wheel of a vehicle such that the trailer brake actuation mechanism can be operated by a vehicle operator without requiring the operator to remove a hand from the steering wheel.

In view of the state of the known technology, one aspect of the disclosure is a vehicle body assembly that includes a steering column assembly, a steering wheel, an actuator mechanism and a controller. The steering wheel is rotatably supported to the steering column assembly for rotation about a first axis. The actuator mechanism is connected to the steering column assembly. The actuator mechanism includes a lever movable relative to the steering column assembly between a first position and a second position about a second axis that extends in a direction perpendicular to the first axis. The controller is operably connected to the actuator mechanism and to a trailer connector such that in response to the lever moving from the first position toward the second position, the controller transmits a braking signal to the trailer connector corresponding to activation of a trailer braking system of a trailer.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
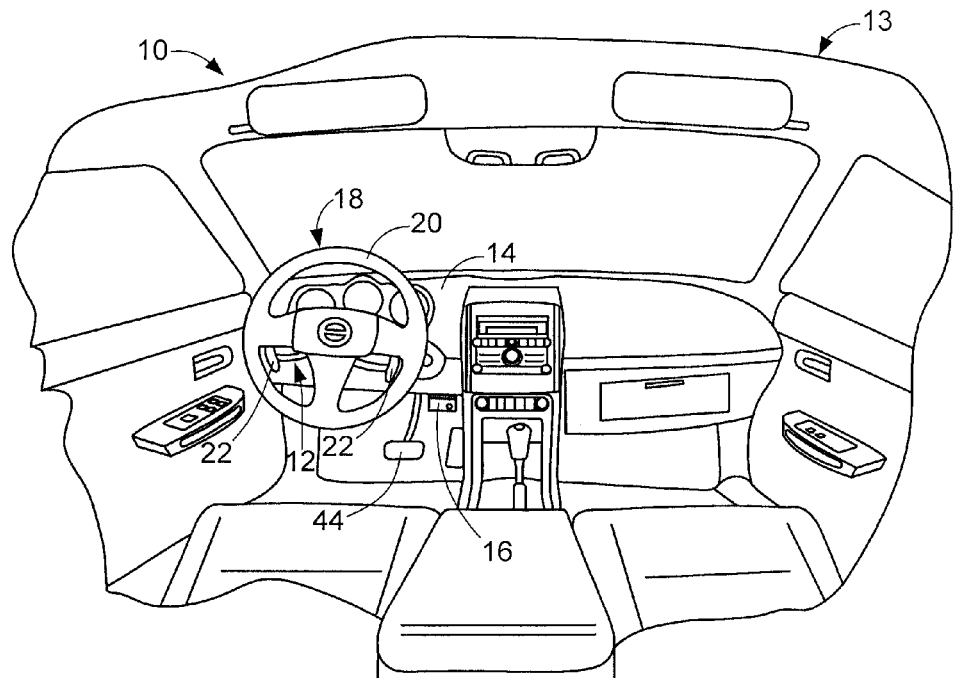
FIG. 1 is a perspective view of a passenger compartment of a vehicle showing a brake pedal that can be used to operate vehicle brakes and trailer brakes, a steering column with an actuator mechanism that is configured to manually operate trailer brakes separately from the vehicle brakes, and a display panel mounted to an instrument panel within the passenger compartment in accordance with a first embodiment.
Figure 2:
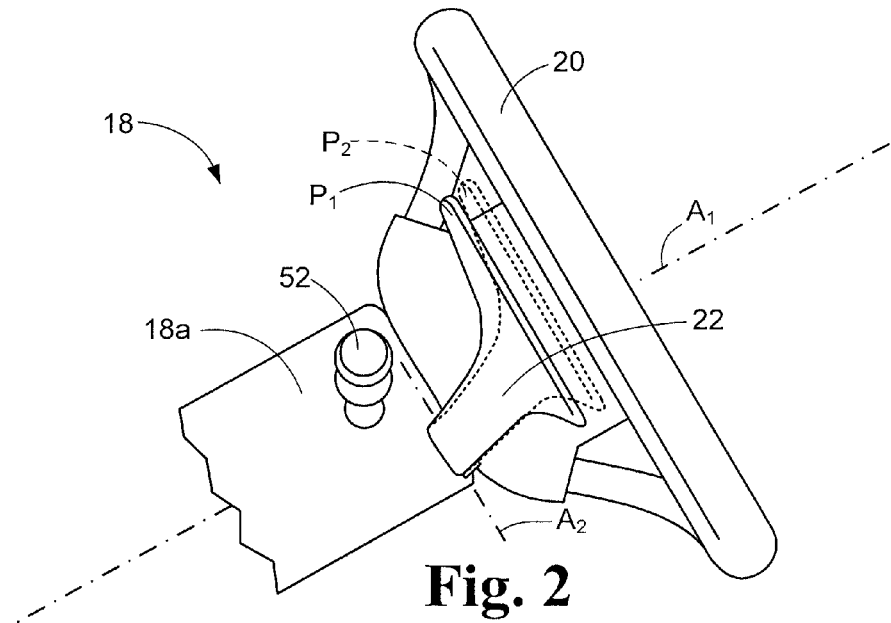
FIG. 2 is a side view of the steering column of the vehicle showing the actuator mechanism movable between a first position and a second position in accordance with the first embodiment.

Referring initially to FIGS. 1 and 2, a vehicle 10 is illustrated in accordance with a first embodiment that is provided with a trailer brake control system 12 that is described in greater detail below.

The vehicle 10 includes a passenger compartment 13 having an instrument panel 14, a trailer brake display panel 16 mounted to a portion of the instrument panel 14, a steering column assembly 18, a steering wheel 20 rotatably supported to the steering column assembly 18 and a pair of actuator mechanisms 22 that are coupled to the steering column assembly 18. The display panel 16 and the actuator mechanisms 22 are part of the trailer brake control system 12 (FIG. 11), which is configured to control operation of trailer brakes 24 (FIG. 11), and is described in greater detail below.

Figure 3:
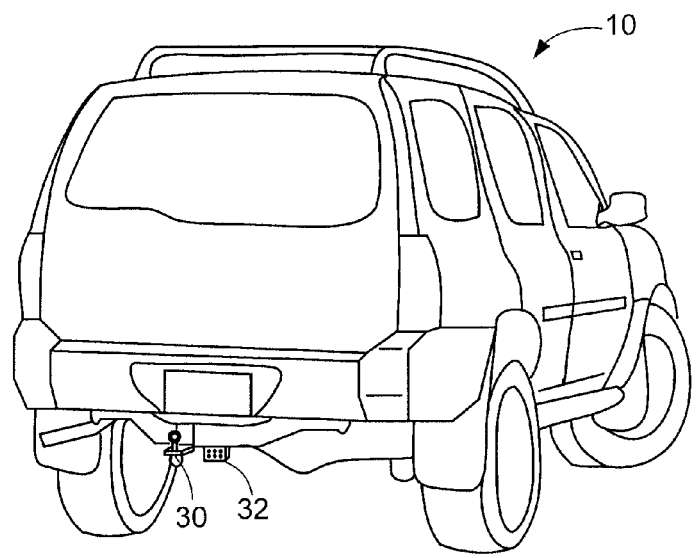
FIG. 3 is a rear perspective view of the vehicle showing a trailer hitch for towing a trailer and an electrical connector that connects to a wiring harness of the trailer in accordance with the first embodiment.
Figure 4:
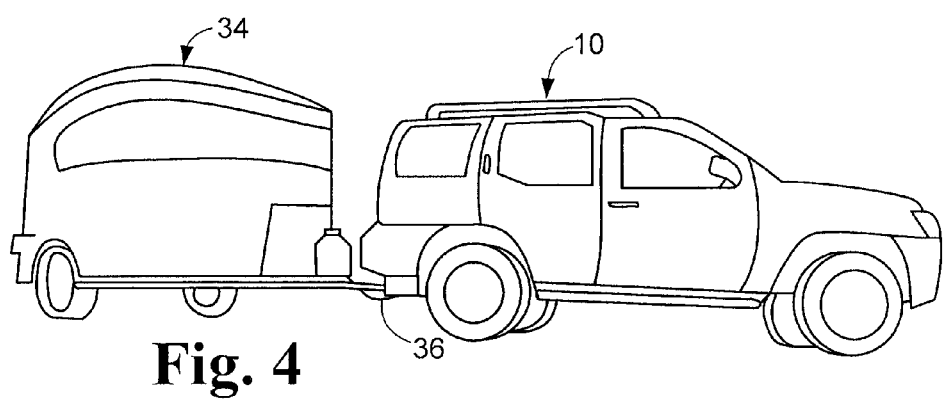
FIG. 4 is a side view of the vehicle and the trailer with the trailer attached to the trailer hitch and the wiring harness of the trailer attached to the electrical connector of the vehicle in accordance with the first embodiment.
Figure 11:
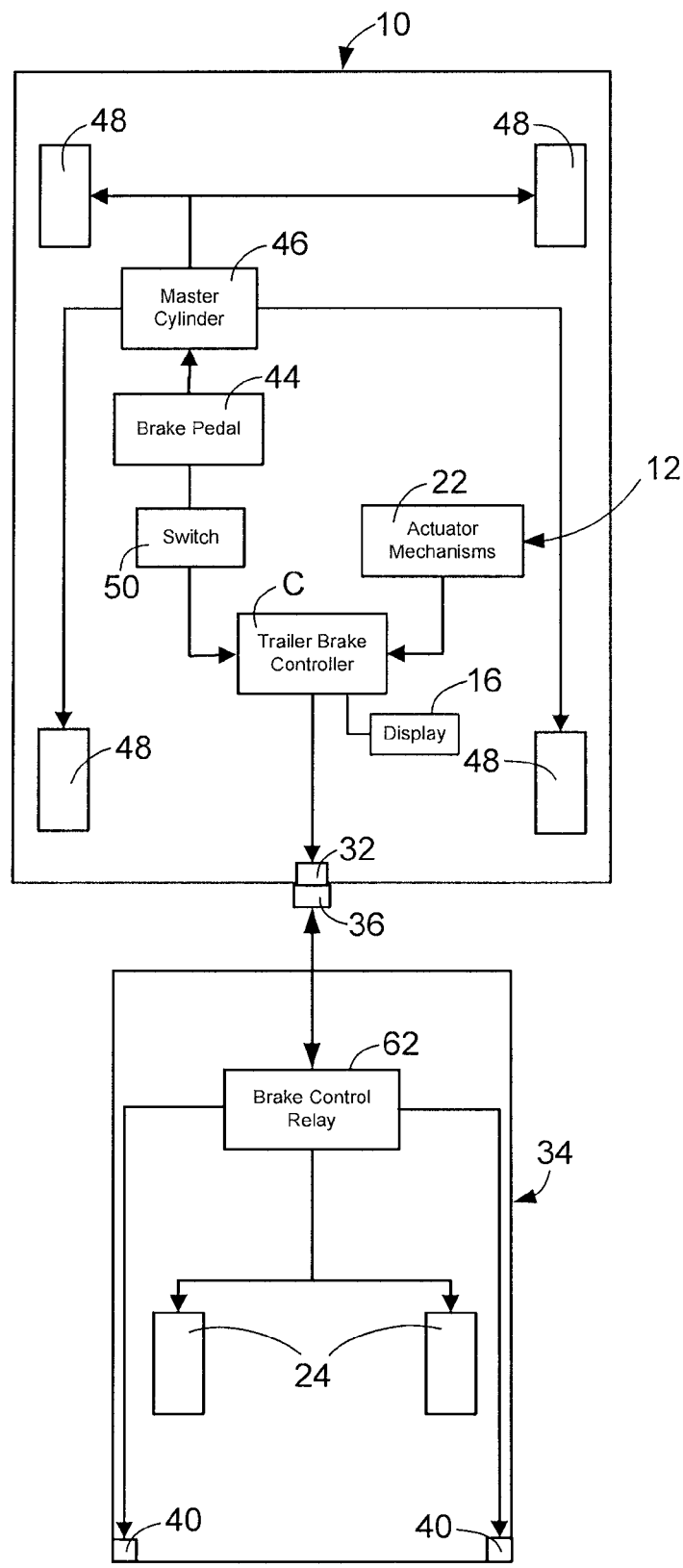
FIG. 11 is a schematic view of the vehicle and the trailer showing the actuator mechanism connected a controller, the display panel, the electrical connector, vehicle brakes, the wiring harness of the trailer connected to the electrical connector, a trailer brake control relay and trailer brakes in accordance with the first embodiment.

As shown in FIG. 3, a rear end of the vehicle 10 includes a trailer hitch 30 and an electrical connector 32 (a trailer connector). The trailer hitch 30 is a conventional structure that provides the vehicle 10 with towing capabilities. As shown in FIG. 4, the trailer 34 can be attached to the trailer hitch 30 in a conventional manner, such that the trailer 34 can be towed behind the vehicle 10. The electrical connector 32 is connected to a wiring harness 36 on the trailer 34 when the trailer 34 is attached to the trailer hitch 30. As indicated in FIG. 11, the wiring harness 36 is connected to trailer brake lights 40 and the trailer brakes 24. Since the various parts of the trailer 34, such as the wiring harness 36, the trailer brake lights 40 and trailer brakes 24 are conventional components, further description is omitted for the sake of brevity.

Figure 5:
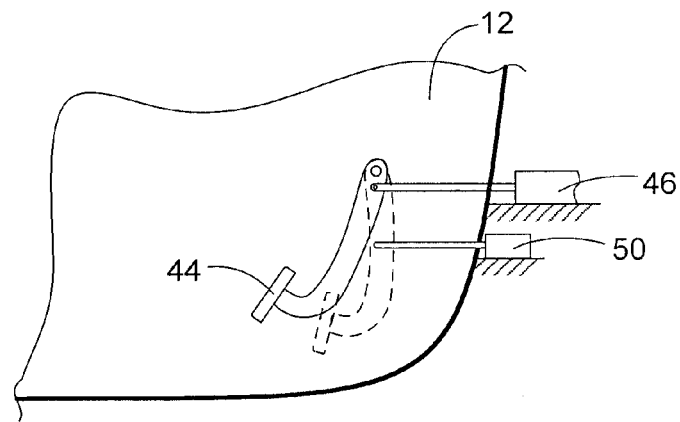
FIG. 5 is a side view of the brake pedal movable between a brake dis-engaged position and a brake engaging position and a brake light switch in accordance with the first embodiment.

As shown in FIGS. 1, 5 and 11, the passenger compartment 13 of the vehicle 10 is also provided with a conventional brake pedal 44 that is used to engage and dis-engage vehicle brakes 48 (FIG. 11) of the vehicle 10. For example, as shown in FIG. 5 the brake pedal 44 can be connected to a master cylinder 46 that is hydraulically connected to the vehicle brakes 48 (see FIG. 11), in a conventional manner. Further, the brake pedal 44 is also typically connected to a brake light switch 50 that turns vehicle brake lights (not shown) on and off in concert with engagement and disengagement of the vehicle brakes 48. The brake light switch 50 is depicted as being separate from the master cylinder 46. However, the brake light switch 50 can alternatively be connected to the hydraulic lines of the master cylinder 46 such that increases in hydraulic pressure (corresponding to vehicle brake 48 operation) is used to turn vehicle brake lights on and off.

As is explained in greater detail below, the brake light switch 50 is further connected to a controller C (FIG. 11), where signals corresponding to operation of the vehicle brakes 48 are utilized to operate the trailer brakes 24. More specifically, the brake light switch 50 provides a signal to the controller C that indicates not only that the vehicle brakes 48 are dis-engaged or engaged, but also provides the amount of brake pressure being applied to the brake pedal 44 by the vehicle operator. In other words, when the vehicle brakes 48 are operated, the trailer brakes 24 are also synchronously operated by movement of the brake pedal 44 when the trailer 34 is properly attached to the vehicle 10 and the electrical connector 32.

Since the operation of the brake pedal 44, the master cylinder 46 and the vehicle brakes 48 are conventional, further description is omitted for the sake of brevity.

Figure 6:
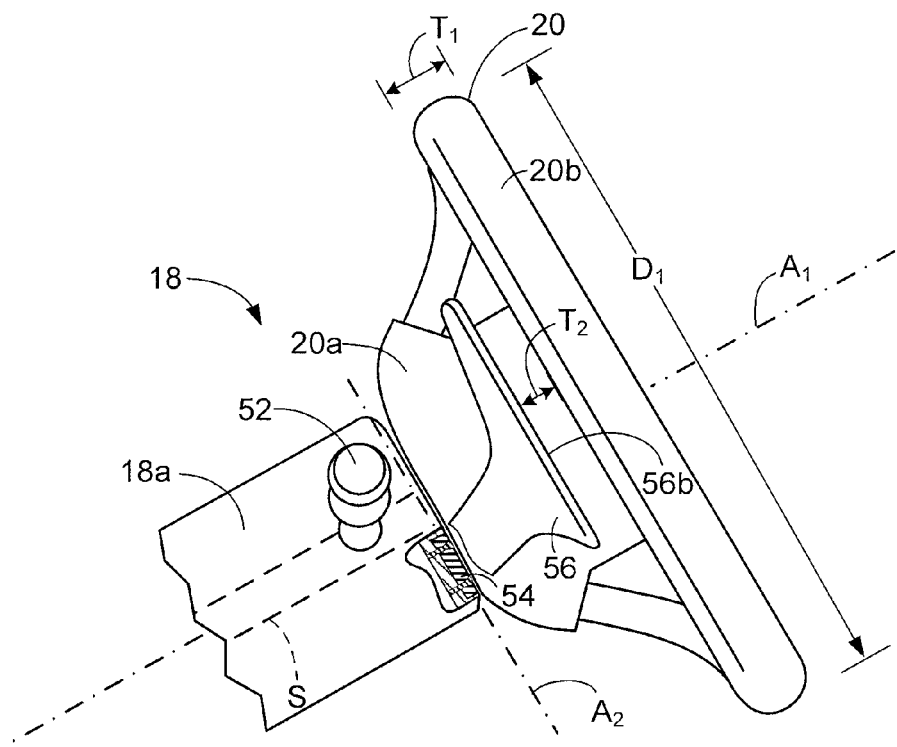
FIG. 6 is another side view of the steering column of the vehicle showing the actuator mechanism mechanically attached to the steering column in accordance with the first embodiment.

As shown in FIGS. 2 and 6, the steering column assembly 18 includes an upper column end 18a and the steering wheel 20. Although not shown, the steering column assembly 18 can include a tilting mechanism such that the upper column end 18a can tilt relative to a lower column end (not shown). The steering wheel 20 is mounted to the upper column end 18a for rotational movement about a first axis $A_1$ to effect steering of the vehicle 10 in a conventional manner. A conventional turn signal mechanism 52 is installed to the upper column end 18a.

More specifically, the steering wheel 20 includes a central portion 20a and an outer grip portion 20b. The central portion 20a is connected to a shaft S (shown in phantom in FIG. 6) that extends through a central portion of the upper column end 18a in a conventional manner. As shown in FIG. 6, the outer grip portion 20b has an outer diameter $D_1$, and the outer grip portion 20b further has a thickness $T_1$, as measured in a direction parallel to the first axis $A_1$.

Referring again to FIGS. 2 and 6, the actuator mechanisms 22 (only one is depicted in FIGS. 2 and 6) are installed to the upper column end 18a at a location adjacent to the steering wheel 20. Further, relative to an axial direction (parallel to the first axis $A_1$) of the steering column assembly 18, the actuator mechanisms 22 are located between the turn signal mechanism 52 and the steering wheel 20. More specifically, as shown in FIG. 6, the depicted actuator mechanism 22 is connected via fasteners to the upper column end 18a. Hence, the steering wheel 20 rotates relative to both the upper column end 18a and to the actuator mechanisms 22. In the embodiment depicted in FIG. 6, the actuator mechanisms 22 pivot about a second axis $A_2$ that is fixed relative to the upper column end 18a of the steering column assembly 18. In the depicted embodiments, the second axis $A_2$ is perpendicular to the first axis $A_1$.

Figure 7:
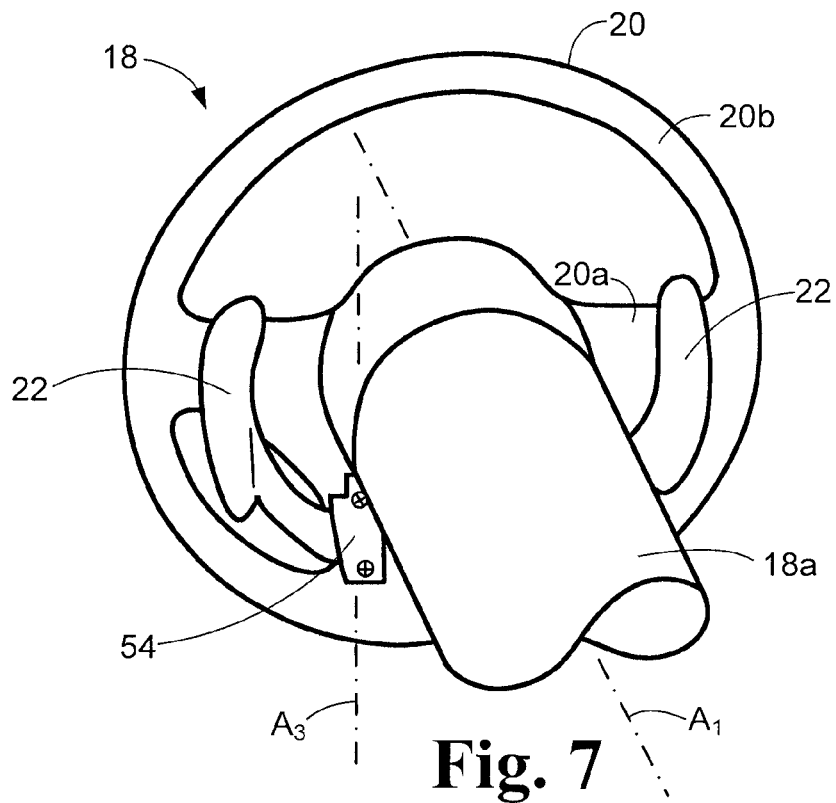
FIG. 7 is a perspective view of the steering column of the vehicle showing the actuator mechanism mechanically attached to the steering wheel in accordance with a modification to the first embodiment.

Alternatively, as shown in FIG. 7 in a modification to the first embodiment, the actuator mechanism 22 can be connected via fasteners to the steering wheel 20 such that the steering wheel 20 and the actuator mechanisms 22 rotate together as a single unit. In the embodiment depicted in FIG. 7, the actuator mechanisms 22 pivot about a third axis $A_3$ that is fixed relative to the steering wheel 20. However, the third axis $A_3$, like the second axis $A_2$, extends in a direction that is perpendicular to the first axis $A_1$. However, it should be understood from the drawings and description herein that the second axis $A_2$ (and third axis $A_3$) can be slightly angularly offset from a direction perpendicular to the first axis $A_1$. For example, when viewed from the side, the second axis $A_2$ (and third axis $A_3$) can be inclined by between 1 degree and 10 degrees from a direction perpendicular to the first axis $A_1$. For instance, the angle of inclination can be 2 degrees, 4 degrees, 6 degrees, or any measured angle between 1 and 10 degrees.

Figure 8:
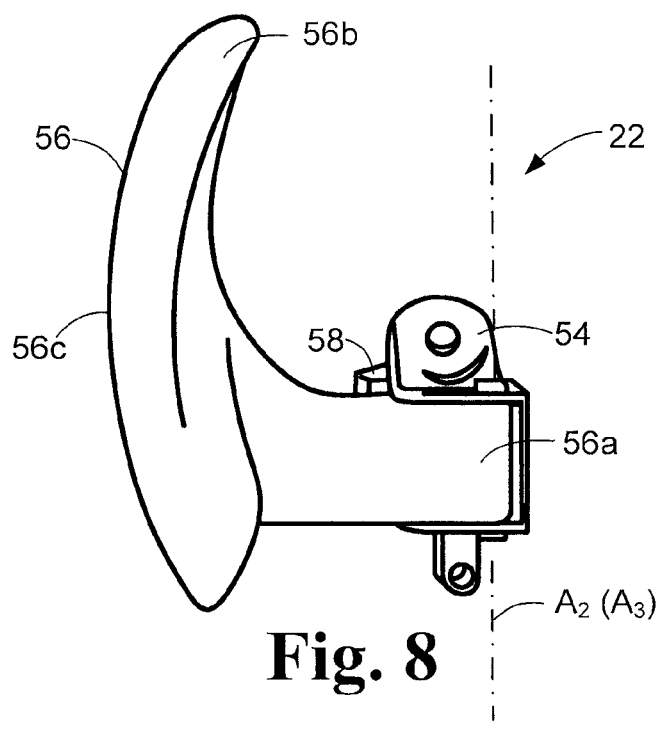
FIG. 8 is a plan view of the actuator mechanism shown removed from the steering column showing a base portion, a lever with a paddle end and a movement detector in accordance with the first embodiment.
Figure 9:
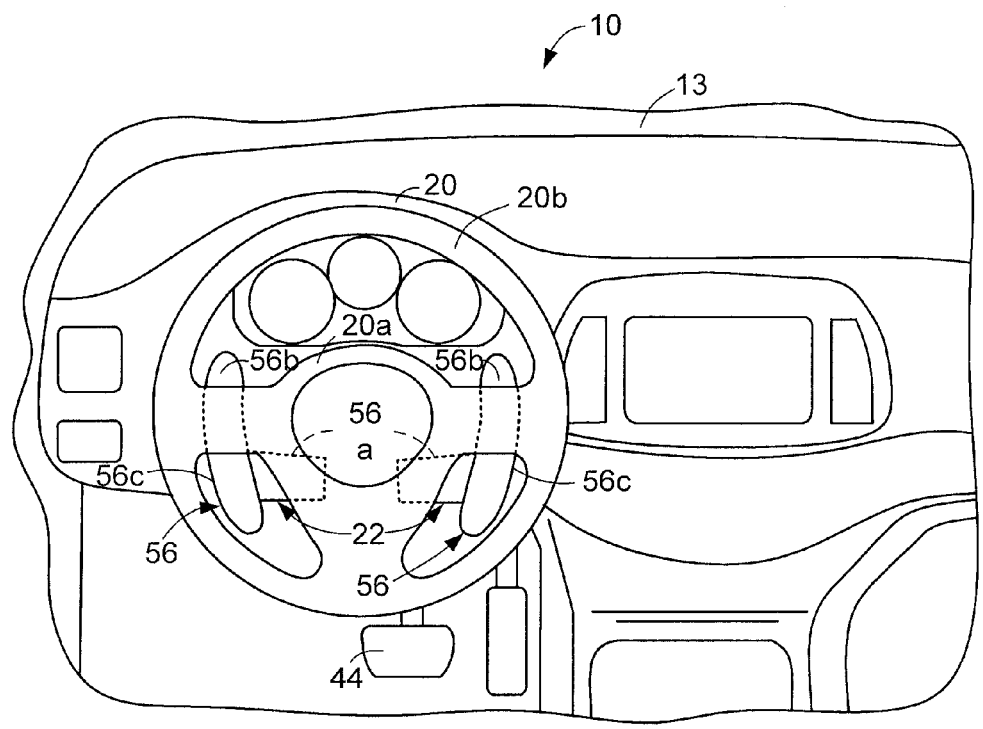
FIG. 9 is an elevational view of a portion of the instrument panel and the steering column showing details of the steering wheel and the actuator mechanism in accordance with the first embodiment.

In FIG. 8, one of the actuator mechanisms 22 is shown removed from the steering column assembly 18. The actuator mechanisms 22 are basically identical to one another, except that they are symmetrical mirror images of one another. However, they are otherwise functionally identical. Therefore, description of one of the actuator mechanisms 22 applies equally to both. The depicted actuator mechanism 22 in FIG. 8 includes a base member 54, a lever 56 and a movement detector 58. The base member 54 includes flanges with openings that receive fasteners that mount the actuator mechanism 22 to the steering column 18, as shown in FIG. 6, or to the steering wheel 20, as shown in the modification to the first embodiment depicted in FIG. 7.

The lever 56 includes a pivot end 56a and a paddle end 56b. The pivot end 56a attaches to the base member 54 for pivotal movement about the second axis $A_2$ (or the third axis $A_3$). The pivot end 56a can include projections that fit into openings in the base member 54, where the projections define the second axis $A_2$, or a pivot shaft can be inserted through the openings in the base member 54 and through the distal end 56a of the lever 56 defining the second axis $A_2$. The paddle end 56b has an outer edge 56c that has an arcuate shape that mimics or concentrically parallels the arcuate contour of the outer grip portion 20b of the steering wheel 20. However, the arcuate shape of the outer edge 56c is not required to be concentric with the outer grip portion 20b of the steering wheel 20. As shown in FIG. 2, the lever 56 is moveable from a first position $P_1$ to a second position $P_2$. The lever 56 includes a biasing member (not shown) that biases the lever 56 to the first position $P_1$. More specifically, when the vehicle operator has released the lever 56 after moving the lever 56 away from the first position $P_1$, the biasing force causes the lever 56 to return to the first position $P_1$.

The movement detector 58 of the actuator mechanism 22 detects and measures the amount of movement of the lever 56 from the first position $P_1$ to the second position $P_2$. Specifically, the movement detector 58 provides a signal to the controller C that corresponds to movement to and from a plurality of positions between the first position $P_1$ and the second position $P_2$. The movement detector 58 can be an analog device, such as a potentiometer or can be a digital device that detects movements as a series of steps between the first position $P_1$ and the second position $P_2$. Since such movement detectors are conventional, further description is omitted for the sake of brevity.

As shown in FIGS. 1, 2, 6 and 7-9, the paddle end 56b of the lever 56 is dimensioned and positioned relative to the outer grip portion 20b of the steering wheel 20 to provide convenient access by the vehicle operator. Specifically, since the paddle end 56b is located proximate the outer grip portion 20b of the steering wheel 20, the vehicle operator can easily contact the paddle end 56d and move the lever 56 without removing his or her hand from the outer grip portion 20b of the steering wheel 20. More specifically, as shown in FIG. 6, as measured in an axial direction of the steering column assembly 20 (parallel to the first axis $A_1$) in first position $P_1$, the paddle end 56b is spaced apart from the outer grip portion 20b by a distance $T_2$. The distance $T_2$ is approximately equal to the thickness $T_1$ of the outer grip portion 20b. However, the lever 56 can be shaped and dimensioned such that the distance $T_2$ is less than the thickness $T_1$, or greater than the thickness $T_1$. The distance $T_2$ is such that the vehicle operator can contact the paddle end 56b of the lever 56 with his or her fingers and move the lever 56 from the first position $P_1$ to the second position $P_2$, without removing his or her hands from the steering wheel 20.

Figure 10:
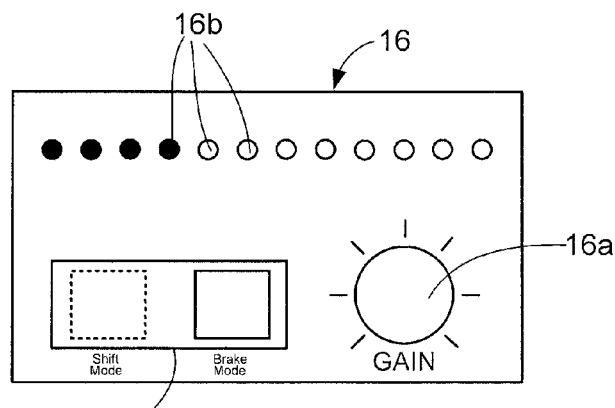
FIG. 10 is a plan view of the display panel in accordance with the first embodiment.

The display panel 16, as shown in FIG. 10, includes a gain control dial 16a and gain indicator lights 16b. The gain control dial 16a provides a way to adjust the relationship between the level of engagement of the vehicle brakes 48 and the level of engagement of the trailer brakes 24. More specifically, if the trailer 34 includes a very heavy load, the vehicle operator can adjust the gain control dial 16a to increase the amount of braking force applied by the trailer brakes 24 relative to the amount of braking force applied by the vehicle brakes 48. Similarly, if the trailer 34 includes a very light load, the vehicle operator can adjust the gain control dial 16a to decrease the amount of braking force applied by the trailer brakes 24 relative to the amount of braking force applied by the vehicle brakes 48. The gain indicator lights 16b provide a visual indication of current gain setting. Since such brake control gain adjustment is a conventional feature, further description is omitted for the sake of brevity.

Figure 12:
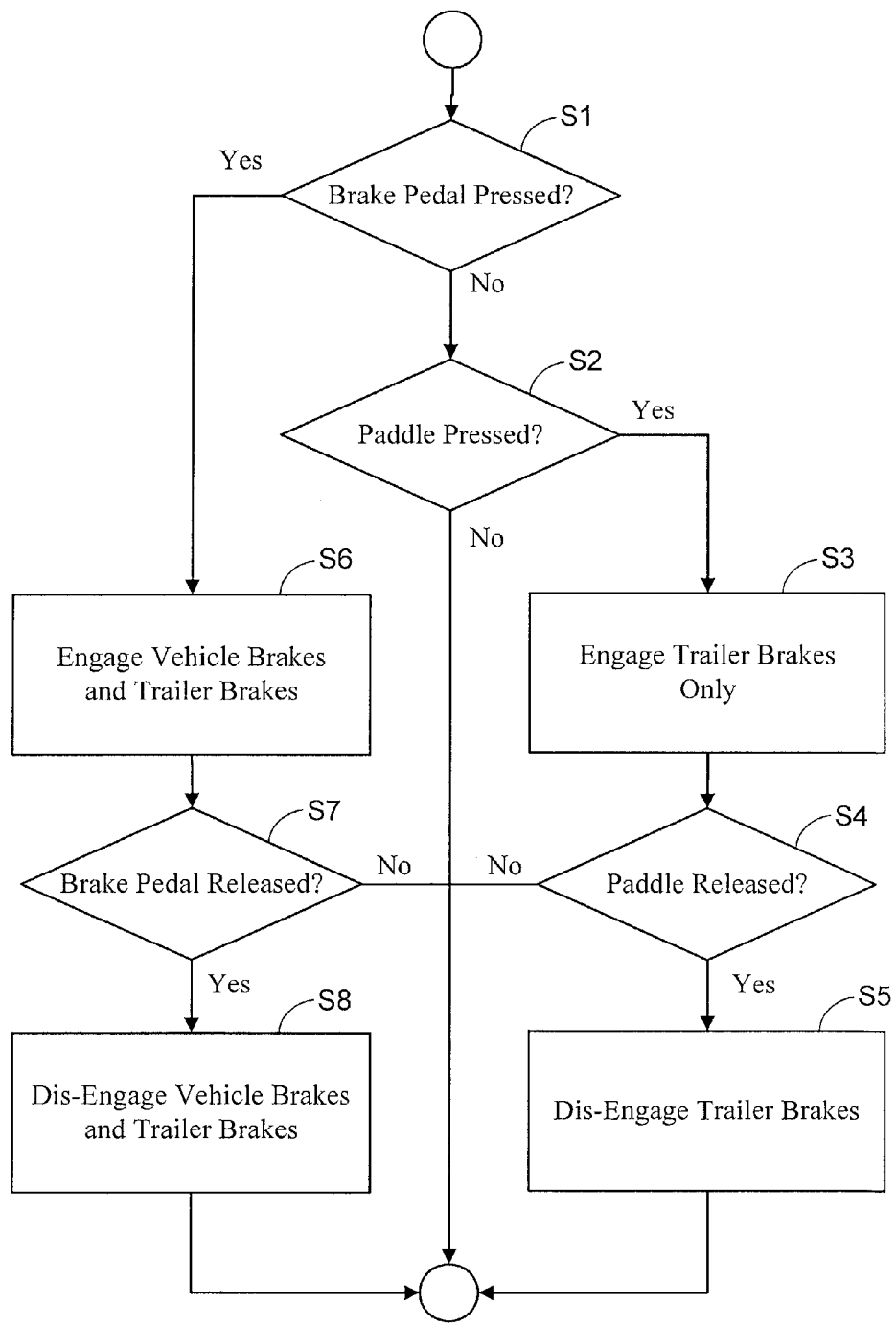
FIG. 12 is a flowchart showing basic logic employed by the controller in the control of the vehicle brakes and the trailer brakes in accordance with the first embodiment.

A description is now provided of the trailer brake control system 12 with specific reference to FIGS. 11 and 12. The trailer brake control system 12 basically includes the brake actuators 22, the electrical connector 32, the brake light switch 50, the display panel 16 and the controller C. The brake light switch 50 is further connected to the brake pedal 44, the master cylinder and the vehicle brakes 48.

As mentioned above, the trailer 34 includes the trailer brakes 24, the trailer brake lights 40 and the wiring harness 36. The trailer 34 also includes a brake control relay 62 that is electrically connected to the trailer brakes 24, the trailer brake lights 40 and the wiring harness 36. As indicated in FIG. 11, the wiring harness 36 of the trailer connects to the electrical connector 32, thereby operably connecting to the controller C.

As shown in FIG. 11, the controller C of the trailer brake control system 12 is operably connected to the actuator mechanisms 22 and to the trailer connector such that in response to the lever 56 of the actuator mechanism 22 moving from the first position $P_1$ toward the second position $P_2$, the controller C transmits a braking signal to the trailer connector 32 corresponding to activation of the trailer brakes 24 of the trailer 34.

A description of the basic operation of the trailer brake control system 12 is now provided with respect to the flowchart depicted in FIG. 12. At step S1, the controller C determines whether or not the brake pedal 44 has been pressed. If not, operation then moves to step S2. At step S2, the controller C determines whether or not the paddle end 56b of the lever 56 has been moved away from the first position $P_1$ toward the second position $P_2$. If the paddle end 56b of the lever 56 has been moved away from the first position $P_1$, the controller C determines the amount of movement between the first position $P_1$ and the second position $P_2$ based on the signals from the brake light switch 50 and, at step S3 sends a corresponding signal to the electrical connector 32 that causes the trailer brake control relay 62 to engage the trailer brakes 24 such that an appropriate amount of force is applied by the trailer brakes 24 proportional to the amount of movement of the paddle end 56b of the lever 56. Further, at step S3, the vehicle brakes 48 are not engaged, only the trailer brakes 24 are engaged by the controller C in response to the actions of the vehicle operator operating the lever 56 of one or both of the actuator mechanisms 22.

At step S4, the controller C determines whether or not the paddle end 56b of the lever 56 has been released and returned to the first position $P_1$. If the paddle end 56b of the lever 56 of the actuator mechanism 22 has returned to the first position $P_1$, operation moves to step S5 where the controller C sends a corresponding signal to the electrical connector 32 to release ore dis-engage the trailer brakes 24. If not, the trailer brakes 24 continue to be engaged.

Returning to step S1, if the controller C determines that the brake pedal 44 has been pressed, then operation moves to step S6. At step S6, the vehicle brakes 48 are engaged (by hydraulic pressure) and the controller C sends a corresponding signal to the electrical connector 32 that causes the trailer brake control relay 62 to engage the trailer brakes 24 such that an appropriate amount of force is applied by the trailer brakes 24 proportional to the amount of movement of brake pedal 44, in correspondence with signals received from the brake light switch 50. The appropriate amount of force applied by the trailer brakes 24 at step S6 is further augmented by the controller C detecting the gain setting of the gain control dial 16a on the display panel 16.

At step S7, the controller C determines whether or not the brake pedal 44 has been released. If the brake pedal 44 has been released, then in step S8, the vehicle brakes 24 are released or dis-engaged. If not, the vehicle brakes 24 remain engaged.

It should be understood from the steps in FIG. 12 that through each iteration of the flowchart in FIG. 12 the controller C makes incremental increases in the magnitude of the braking signal transmitted to the electrical connector 32 (the trailer connector) in response to detecting the incremental movement of the lever 56 of either of the actuator mechanisms 22. In other words, if the vehicle operator gradually increases the displacement of the lever 56 of either of the actuator mechanisms 22 from the first position $P_1$ to the second position $P_2$, then the amount of force applied by the trailer brakes 24 is correspondingly increased.

In the above described first embodiment, the trailer brake control system 12 is configured such that the actuator mechanisms 22 operate in tandem, meaning that movement of one of the actuator mechanisms 22 has the same effect as movement of both of the actuator mechanisms 22. However, in a modification to the first embodiment, it is possible for one of the actuator mechanisms 22 to cause the controller C to engage and dis-engage the trailer brakes 24 and the other of the actuator mechanisms 22 to serve as a gain control adjuster, eliminating the gain control dial 16a on the display panel 16.

As well, in the above described first embodiment, the trailer brake control system 12 is configured such that the actuator mechanisms 22 are only provided in the vehicle 10 for the purpose of operating the trailer brakes 24, bypassing the brake operating capability of the brake pedal 44.

However, in a further modification to the first embodiment, the actuator mechanisms 22 have multiple functions. Specifically, the actuator mechanism can be connected to a transmission (not shown) of the vehicle 10 and the display panel 16 can be provided with a mode operation switch 16c. The mode operation switch 16c is connected to the actuator mechanisms 22, the controller C and the transmission (not shown). As shown in FIG. 10, the optional mode operation switch 16c has two settings, a Shift Mode setting and a Brake Mode setting. When the mode operation switch 16c is set to the Shift Mode setting, the actuation mechanisms 22 are connected to the transmission and are used by the vehicle operator for manual shifting. Such manual shifting operations are conventional and therefore further description of manual shifting effected by the actuation mechanisms 22 is omitted for the sake of brevity. When the mode operation switch 16c is set to the Brake Mode setting, the actuation mechanisms 22 are disconnected from the transmission and instead set to operate within the trailer brake control system 12, as described above with respect to the disclosures in FIGS. 11 and 12.

It should be understood from the drawings and the description herein that the controller C can be located within the display panel 16 or can be located elsewhere within the vehicle 10.

Second Embodiment

Figure 13:
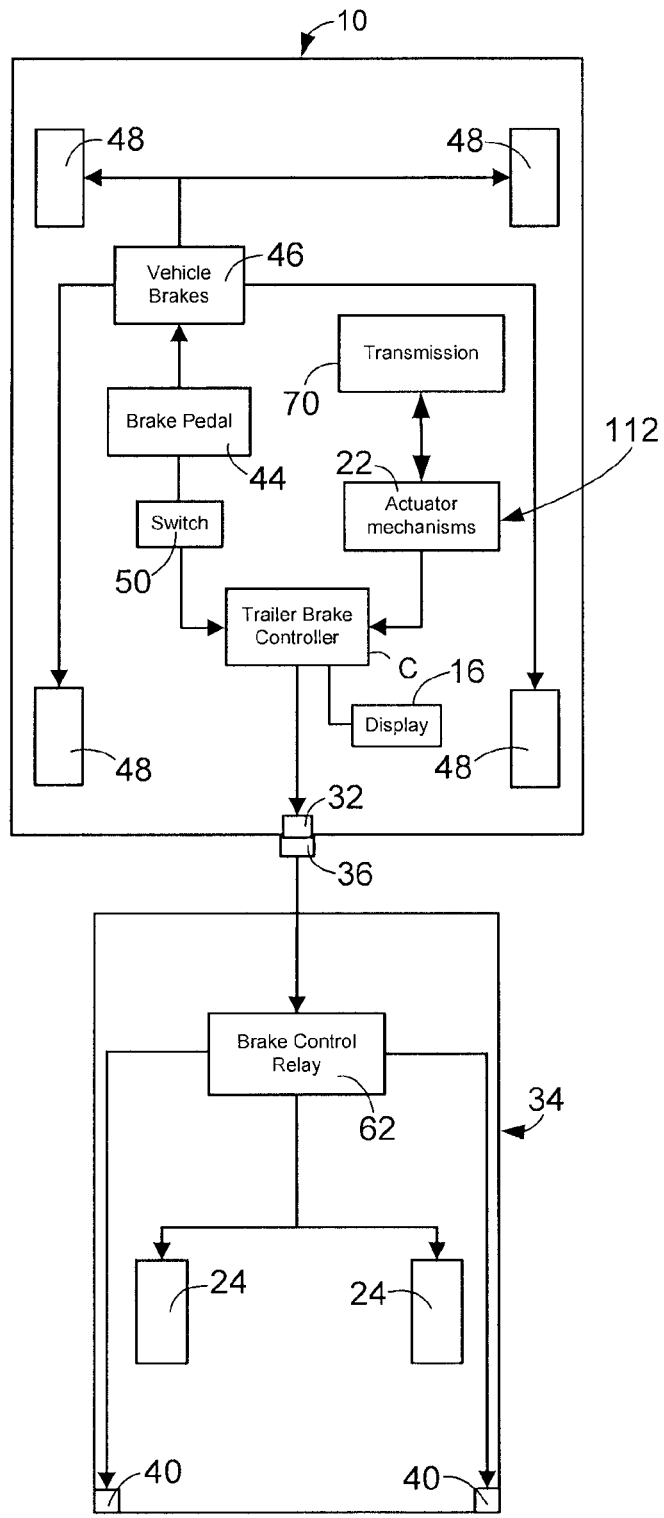
FIG. 13 is a schematic view of a vehicle and the trailer showing the actuator mechanism connected a controller, a display panel, the electrical connector, vehicle brakes, a vehicle transmission, the wiring harness of the trailer connected to the electrical connector, the trailer brake control relay and the trailer brakes in accordance with a second embodiment.
Figure 14:
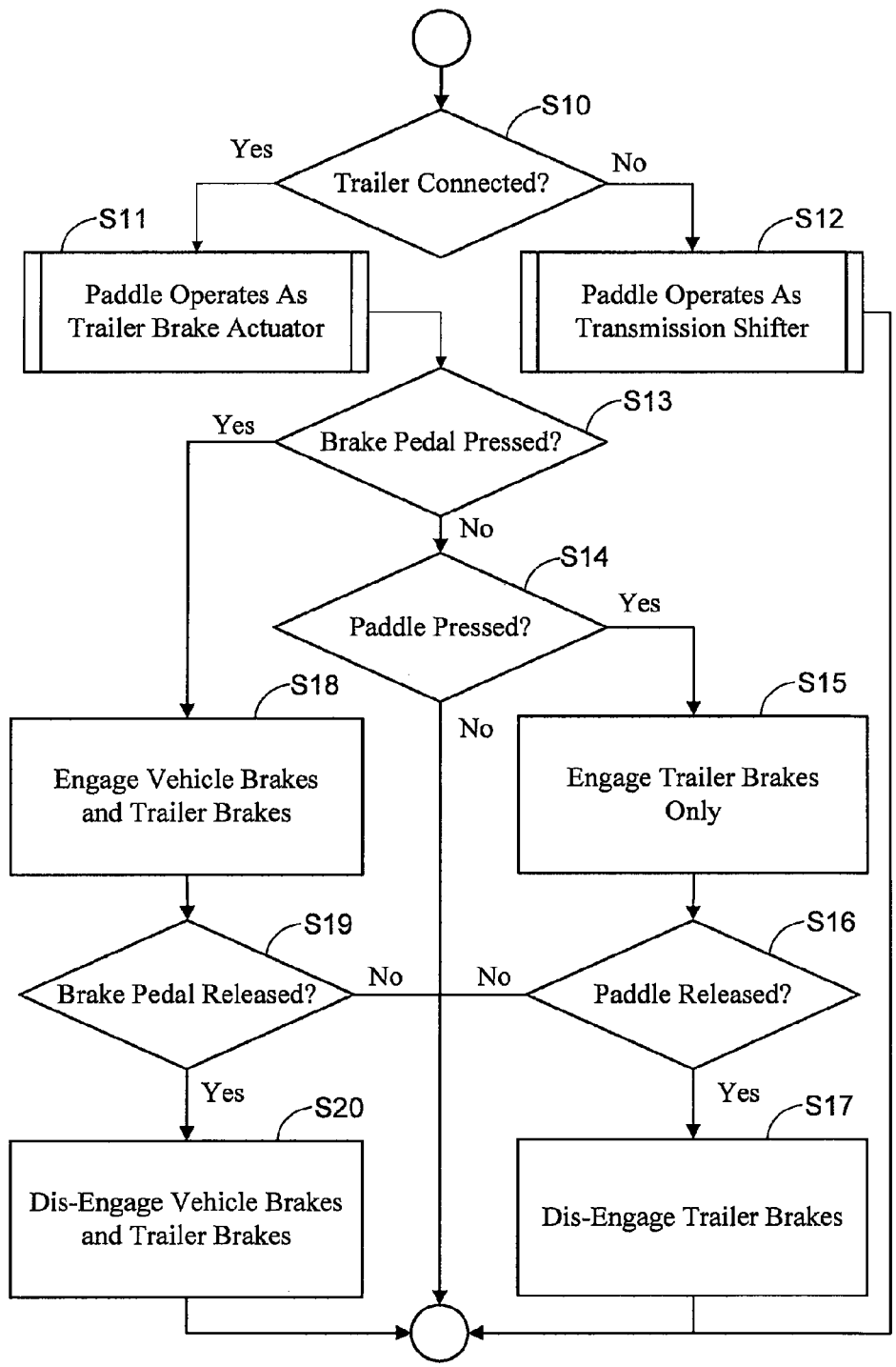
FIG. 14 is a flowchart showing basic logic employed by the controller in switching functionality of the actuator mechanism from controlling transmission shifting to controlling the trailer brakes in accordance with the second embodiment.
Figure 15:
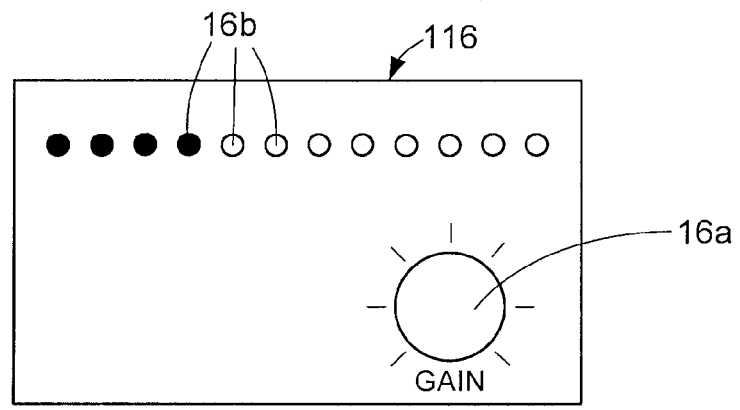
FIG. 15 is a plan view of a display panel in accordance with the second embodiment.

Referring now to FIGS. 13, 14 and 15, trailer brake control system 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The trailer brake control system 112 includes many of the features described above with respect to the first embodiment, such as the brake actuators 22, the electrical connector 32, the brake light switch 50, a display panel 116 and the controller C. The brake light switch 50 is further connected to the brake pedal 44, the master cylinder and the vehicle brakes 48. However, in the second embodiment a transmission 70 of the vehicle 10 is further connected to the actuator mechanisms 22 and the controller C.

Further, the trailer 34 includes the trailer brakes 24, the trailer brake lights 40 and the wiring harness 36. The trailer 34 also includes a brake control relay 62 that is electrically connected to the trailer brakes 24, the trailer brake lights 40 and the wiring harness 36. As indicated in FIG. 13, the wiring harness 36 of the trailer is connected to the electrical connector 32, thereby operably connecting to the controller C.

As shown in FIG. 13, the controller C of the trailer brake control system 112 is operably connected to the actuator mechanisms 22 and to the trailer connector 32 such that in response to the lever 56 of the actuator mechanism 22 moving from the first position $P_1$ toward the second position $P_2$, the controller C transmits a braking signal to the trailer connector 32 corresponding to activation of the trailer brakes 24 of the trailer 34.

A description of the basic operation of the trailer brake control system 112 in accordance with the second embodiment is now provided with respect to the flowchart depicted in FIG. 14. At step S10, the controller C determines whether or not the trailer 34 is connected to the vehicle 10. More specifically, the controller C determines whether or not the wiring harness 36 of the trailer 34 is connected to the electrical connector 32 of the trailer brake control system 112. If the wiring harness 36 is connected to the electrical connector 32, then at step S11 the controller C sets the actuator mechanisms 22 to operate as part of the trailer brake control system 112 to operate the trailer brakes 24. If the wiring harness 36 is not connected to the electrical connector 32, then at step S12 the controller C sets the actuator mechanisms 22 to connect to the transmission 70 and serve as manual gear shifting levers.

After step S11 and at step S13, the controller C determines whether or not the brake pedal 44 has been pressed. If not, operation then moves to step S14. At step S14, the controller C determines whether or not the paddle end 56b of the lever 56 has been moved away from the first position $P_1$ toward the second position $P_2$. If the paddle end 56b of the lever 56 has been moved away from the first position $P_1$, the controller C determines the amount of movement between the first position $P_1$ and the second position $P_2$ based on the signals from the brake light switch 50. Thereafter at step S15, the controller C sends a corresponding signal to the electrical connector 32 that causes the trailer brake control relay 62 to engage the trailer brakes 24 such that an appropriate amount of force is applied by the trailer brakes 24 proportional to the amount of movement of the paddle end 56b of the lever 56. Further, at step S15, the vehicle brakes 48 are not engaged; only the trailer brakes 24 are engaged by the controller C in response to the actions of the vehicle operator operating the lever 56 of one or both of the actuator mechanisms 22.

At step S16, the controller C determines whether or not the paddle end 56b of the lever 56 has been released and returned to the first position $P_1$. If the paddle end 56b of the lever 56 of the actuator mechanism 22 has returned to the first position $P_1$, operation moves to step S17 where the controller C sends a corresponding signal to the electrical connector 32 to release ore dis-engage the trailer brakes 24. If not, the trailer brakes 24 continue to be engaged.

Returning to step S13, if the controller C determines that the brake pedal 44 has been pressed, then operation moves to step S18. At step S16, the vehicle brakes 48 are engaged (by hydraulic pressure) and the controller C sends a corresponding signal to the electrical connector 32 that causes the trailer brake control relay 62 to engage the trailer brakes 24 such that an appropriate amount of force is applied by the trailer brakes 24 proportional to the amount of movement of brake pedal 44; in correspondence with signals received from the brake light switch 50. The appropriate amount of force applied by the trailer brakes 24 at step S8 is further augmented by the controller C detecting the gain setting of the gain control dial 16a on the display panel 16.

At step S19, the controller C determines whether or not the brake pedal 44 has been released. If the brake pedal 44 has been released, then in step S20 the vehicle brakes 24 are released or dis-engaged. If not, the vehicle brakes 24 remain engaged.

It should be understood from the steps in FIG. 14 that through each iteration of the flowchart in FIG. 14 that the controller C makes incremental increases in the magnitude of the braking signal transmitted to the electrical connector 32 (the trailer connector) in response to detecting the incremental movement of the lever 56 of either of the actuator mechanisms 22. In other words, if the vehicle operator gradually increases the displacement of the lever 56 of either of the actuator mechanisms 22 from the first position $P_1$ to the second position $P_2$, then the amount of force applied by the trailer brakes 24 is correspondingly increased.

As shown in FIG. 15, the display panel 116 includes the gain control dial 16a and gain indicator lights 16b described above with respect to the first embodiment. However, there is no mode switch on the display panel 116 since the controller C automatically switches between modes upon detecting whether or not the trailer 34 is connected to the vehicle 10.

Third Embodiment

Figure 16:
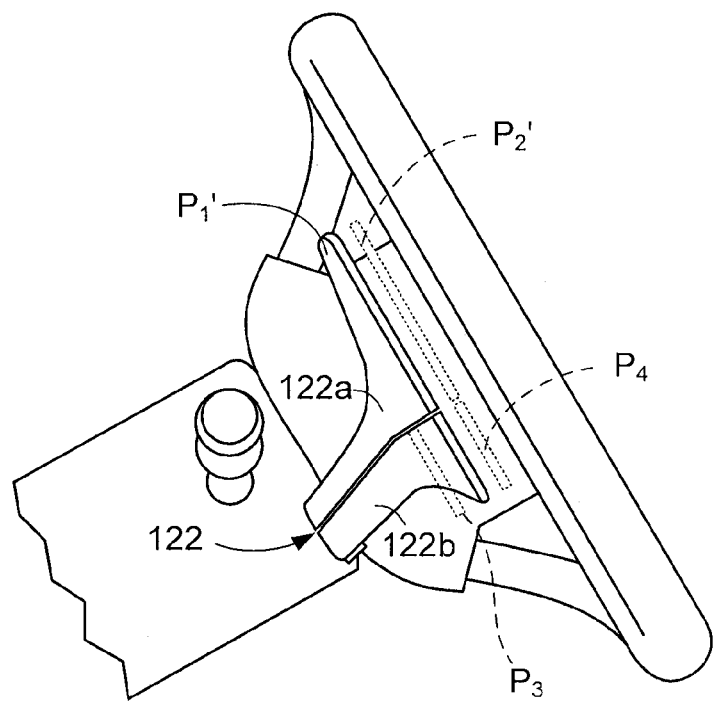
FIG. 16 is a side view of a steering column showing an actuator mechanism with two separate levers in accordance with a third embodiment.

Referring now to FIG. 16, an actuator mechanism 122 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment the actuator mechanism 122 includes two side-by-side levers 122a and 122b. In the third embodiment the lever 122a operates in a manner consistent with the description of the operation of the lever 56 of the actuator mechanism 22 described above with respect to the first embodiment. Specifically, the lever 122a is movable between a first position $P_1'$ and a second position $P_2'$. The movement of the lever 122a is detected by the controller C and results in control of the trailer brakes 24, as described with respect to FIGS. 11 and 12.

The lever 122b is movable to a plurality of locations between the positions $P_3$ and $P_4$, as indicated in phantom in FIG. 16. The lever 122b is connected to the controller C and provides gain adjusting, such that the gain control dial 16a on the display panel 16 can be omitted.

In an alternative modification to the third embodiment, movement of the lever 122a detected by the controller C results in control of the trailer brakes 24, as described with respect to FIGS. 11 and 12. However in the modification to the third embodiment, the lever 122b remains connected to the transmission 70 and provides manual gear shifting capability, while the lever 122a is permanently configured to operate the trailer brakes 24.

Fourth Embodiment

Figure 17:
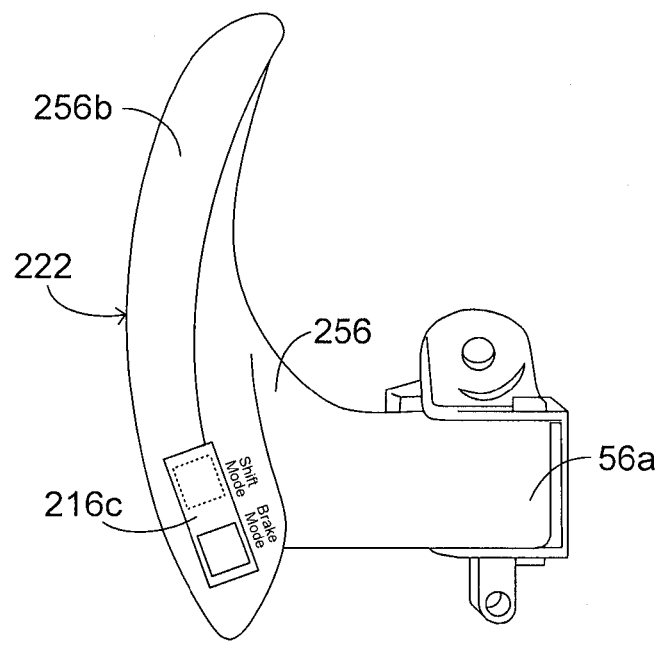
FIG. 17 is a plan view of an actuator mechanism having an operational mode switch in accordance with a fourth embodiment.

Referring now to FIG. 17, an actuator mechanism 222 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, the actuator mechanism 222 includes all of the elements of the actuator mechanism 22 of the first embodiment, but the lever 56 is replaced with a lever 256 that has the pivot end 56a as described above with respect to the first embodiment, but includes a paddle end 256b having a mode operation switch 216c that has an identical function to the mode operation switch 16c described above in the first embodiment.

Fifth Embodiment

Figure 18:
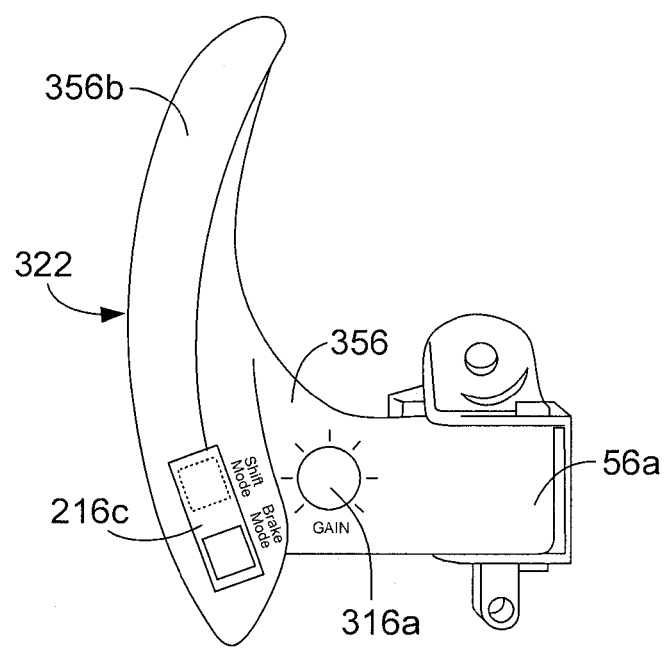
FIG. 18 is a plan view of an actuator mechanism having an operational mode switch and a gain adjuster in accordance with a fifth embodiment.

Referring now to FIG. 18, an actuator mechanism 322 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the fourth embodiment the actuator mechanism 322 includes all of the elements of the actuator mechanism 22 of the first embodiment, but the lever 56 is replaced with a lever 356 that has the pivot end 56a as described above with respect to the first embodiment, but includes a paddle end 356b having the mode operation switch 216c described above in the fourth embodiment, having an identical function to the mode operation switch 16c described above in the first embodiment. The paddle end 356b also includes a gain control dial 316a having an identical function to the gain control dial 16a described above with respect to the first embodiment.

The controller C preferably includes a microcomputer with a brake operating control program that controls the trailer brakes 24, as discussed below. The controller C can also include other conventional components such as an input interface circuit, an output interface circuit, and storage devices such as a ROM (Read Only Memory) device and a RAM (Random Access Memory) device. A microcomputer of the controller C is programmed to control the trailer brakes 24, as described above. The memory circuit stores processing results and control programs such as ones for trailer brake operations that are run by the processor circuit. The internal RAM of the controller C stores statuses of operational flags and various control data. The internal ROM of the controller C stores data and code for various operations. It will be apparent to those skilled in the art from this disclosure that the precise structure and algorithms for the controller C can be any combination of hardware and software that will carry out the functions of the present invention.

The various structural and mechanical features of the vehicle 10 not described above are conventional components that are well known in the art. Since such vehicle features and components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the trailer brake control system 12. Accordingly, these terms, as utilized to describe the present invention should be interpreted relative to a vehicle equipped with the trailer brake control system 12.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body assembly comprising
an actuator mechanism directly attached to one of a steering column assembly and a steering wheel, the actuator mechanism including a lever movable between a first position and a second position, the actuator mechanism is further operably connected to a vehicle transmission; and
a controller operably connected to the actuator mechanism, a vehicle transmission and to a trailer connector, one of the controller and the lever including a switch having a transmission shifting setting and a trailer brake setting such that with the switch in the transmission mode setting movement of the lever of the actuator mechanism controls manual gear shifting functions of the vehicle transmission and with the switch in the trailer brake setting the lever of the actuator mechanism controls braking of the trailer braking system such that in response to the lever moving from the first position toward the second position, the controller transmits a braking signal to the trailer connector corresponding to activation of a trailer braking system of a trailer.

2. The vehicle body assembly according to claim 1, wherein
the lever is further movable to any one of a plurality of intermediary positions between the first position and second position,
the actuator mechanism includes a displacement detection device that detects incremental movement of the lever relative to each of the plurality of intermediary positions between the first and second positions, and
with the switch in the trailer brake setting the controller is configured to make incremental increases in the magnitude of the braking signal transmitted to the trailer connector in response to detecting the incremental movement of the lever.

3. The vehicle body assembly according to claim 1, further comprising
a vehicle braking system; and
a vehicle brake actuator connected to the vehicle braking system and operably coupled to the controller, the vehicle brake actuator being movable between a brake dis-engaging position and a brake engaging position such that with the brake actuator in the brake engaging position the vehicle braking system is engaged and the controller transmits the braking signal to the trailer connector, and
the controller including a bypass mode configured such that in response to the lever being moved from the first position toward the second position and the vehicle brake actuator remaining in the brake dis-engaging position, the controller transmits the braking signal to the trailer connector to engage the trailer braking system while the vehicle braking system remains dis-engaged.

4. A vehicle body assembly, comprising
a steering column assembly;
a steering wheel rotatably supported to the steering column assembly for rotation about a first axis;
an actuator mechanism directly attached to one of the steering wheel and the steering column assembly, the actuator mechanism includes a first lever portion and a second lever portion; and
a controller operably connected to the actuator mechanism, a vehicle transmission and a trailer connector such that operation of the first lever portion controls manual gear shifting functions of the vehicle transmission and the second lever portion controls braking of the trailer braking system.

5. A vehicle body assembly, comprising
a steering column assembly;
a steering wheel rotatably supported to the steering column assembly;
an actuator mechanism connected to one of the steering wheel and the steering column assembly, the actuator mechanism including a lever movable relative to the one of the steering wheel and the steering column assembly between a first position and a second position;
a vehicle transmission; and
a controller operably connected to the actuator mechanism and to a trailer connector, the controller configured to detect whether or not the trailer connector is connected to a trailer,
in response to the controller detecting that there is no trailer connected to the trailer connector, the controller connects the actuator mechanism to the vehicle transmission such that the actuator mechanism controls manual gear shifting functions of the vehicle transmission, and
in response to the controller detecting that there is a trailer connected to the trailer connector, the controller connects the actuator mechanism to the trailer connector such that the actuator mechanism controls the trailer braking system and in response to the lever moving from the first position toward the second position, the controller transmits a braking signal to the trailer connector corresponding to activation of a trailer braking system of the trailer.

6. The vehicle body assembly according to claim 5, wherein
the lever is further movable to any one of a plurality of intermediary positions between the first position and second position, and
the actuator mechanism includes a displacement detection device that detects incremental movement of the lever relative to each of the plurality of intermediary positions between the first and second positions.

7. The vehicle body assembly according to claim 6, wherein
the controller is configured to make incremental increases in the magnitude of the braking signal transmitted to the trailer connector in response to detecting the incremental movement of the lever.

8. The vehicle body assembly according to claim 5, wherein
the actuator mechanism is attached to the steering column assembly, with the steering wheel being rotatable about a first axis that extends through the steering column assembly, and
the lever pivots about a second axis that extends in a second direction perpendicular to the first direction.

9. The vehicle body assembly according to claim 5, wherein
the actuator mechanism is attached to the steering wheel, with the steering wheel being rotatable about a first axis, and
the lever pivots about a second axis that extends in a second direction perpendicular to the first direction.

10. The vehicle body assembly according to claim 5, further comprising
a vehicle braking system; and
a vehicle brake actuator connected to the vehicle braking system and operably coupled to the controller, the vehicle brake actuator being movable between a brake dis-engaging position and a brake engaging position such that with the brake actuator in the brake engaging position the vehicle braking system is engaged and the controller transmits the braking signal to the trailer connector.

11. The vehicle body assembly according to claim 10, wherein
the controller includes a bypass mode configured such that in response to the lever being moved from the first position toward the second position and the vehicle brake actuator remaining in the brake dis-engaging position, the controller transmits the braking signal to the trailer connector to engage the trailer braking system while the vehicle braking system remains dis-engaged.

12. A vehicle body assembly, comprising
an actuator mechanism within the passenger compartment of the vehicle; and
a controller operably connected to the actuator mechanism, to a vehicle transmission and to a trailer connector such that:
in response to the controller detecting that there is no trailer connected to the trailer connector, the controller enables the actuator mechanism to communicate with the vehicle transmission such that the actuator mechanism controls manual gear shifting functions of the vehicle transmission, and
in response to the controller detecting that there is a trailer connected to the trailer connector, the controller enables the actuator mechanism to communicate with the trailer connector such that the actuator mechanism controls a trailer braking system of the trailer.

13. The vehicle body assembly according to claim 12, further comprising
a steering column assembly; and
the actuator mechanism is attached to the steering column assembly, the actuator mechanism including a lever movable relative to the steering column assembly between a first position and a second position, and in response to the lever moving from the first position toward the second position, the controller transmits a braking signal to the trailer connector corresponding to activation of the trailer braking system of the trailer.

14. The vehicle body assembly according to claim 13, further comprising
a steering wheel rotatably supported to the steering column assembly for rotation about a first axis, wherein the lever of the actuator mechanism is movable about a second axis that extends in a direction transverse to the first axis.

15. The vehicle body assembly according to claim 12, further comprising
a steering wheel having an outer grip portion and a central portion rotatably supported to a vehicle passenger compartment for rotation about a first axis, wherein
the actuator mechanism is attached to the central portion of the steering wheel for rotation therewith about the first axis, the actuator mechanism having a lever movable relative to the outer grip portion about a second axis spaced apart from the first axis between a first position and a second position such that with the lever in the second position a free end of the lever is closer to the outer grip portion than in the first position.

16. The vehicle body assembly according to claim 15, wherein the steering wheel is rotatable about a first axis, and the lever of the actuator mechanism is movable about a second axis that extends in a direction perpendicular to the first axis.

17. The vehicle body assembly according to claim 15, wherein the lever is further movable to any one of a plurality of intermediary positions between the first position and second position, the actuator mechanism includes a displacement detection device that detects incremental movement of the lever relative to each of the plurality of intermediary positions between the first and second positions, and the controller is configured to make incremental increases in the magnitude of the braking signal transmitted to the trailer connector in response to detecting the incremental movement of the lever.

18. The vehicle body assembly according to claim 15, further comprises a vehicle braking system; and a vehicle brake actuator connected to the vehicle braking system and operably coupled to the controller, the vehicle brake actuator being movable between a brake dis-engaging position and a brake engaging position such that with the brake actuator in the brake engaging position the vehicle braking system is engaged and the controller transmits the braking signal to the trailer connector.

19. The vehicle body assembly according to claim 18, wherein the controller includes a bypass mode configured such that in response to the lever being moved from the first position toward the second position, the vehicle brake actuator remaining in the brake dis-engaging position, and the controller detecting that there is a trailer attached to the trailer connector, the controller transmits the braking signal to the trailer connector to engage the trailer braking system while the vehicle braking system remains dis-engaged.

20. The vehicle body assembly according to claim 15, wherein the first axis is perpendicular to the second axis.

* * * * *